United States Patent
Jovicevic et al.

(10) Patent No.: US 7,611,200 B2
(45) Date of Patent: Nov. 3, 2009

(54) ADJUSTABLE SEAT FOR USE IN A VEHICLE

(75) Inventors: Niko Jovicevic, Farmington Hills, MI (US); Terence Porter, II, Farmington Hills, MI (US); Tomohito Hashikawa, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/047,609

(22) Filed: Mar. 13, 2008

(65) Prior Publication Data

US 2009/0230745 A1 Sep. 17, 2009

(51) Int. Cl.
*B60N 2/36* (2006.01)

(52) U.S. Cl. .......................................... 297/331; 297/14

(58) Field of Classification Search ................... 297/14, 297/331
See application file for complete search history.

(56) References Cited

U.S. PATENT DOCUMENTS

| | | | | |
|---|---|---|---|---|
| 2,153,155 A * | 4/1939 | Page et al. | .............. | 297/331 X |
| 2,229,608 A * | 1/1941 | Ragsdale et al. | .............. | 297/62 |
| 2,725,921 A * | 12/1955 | Markin | ................... | 297/216.15 |
| 2,859,797 A * | 11/1958 | Mitchelson | .............. | 297/342 X |
| 3,632,165 A * | 1/1972 | Miller | ..................... | 297/343 X |
| 5,112,109 A * | 5/1992 | Takada et al. | ................ | 297/343 |
| 5,156,437 A * | 10/1992 | Hayakawa et al. | .......... | 297/335 |
| 5,156,438 A * | 10/1992 | Hayakawa et al. | .......... | 297/335 |
| 5,158,338 A * | 10/1992 | Hayakawa et al. | .......... | 297/335 |
| 5,195,802 A * | 3/1993 | Hayakawa et al. | .......... | 297/335 |
| 5,320,411 A * | 6/1994 | Sera | ........................... | 297/335 |
| 5,498,052 A * | 3/1996 | Severini et al. | ........... | 297/14 X |
| 6,012,771 A | 1/2000 | Shea | | |
| 6,883,854 B2 * | 4/2005 | Daniel | ...................... | 297/14 X |
| 6,883,868 B2 * | 4/2005 | Yoshida | ...................... | 297/331 |
| 7,270,371 B2 * | 9/2007 | Adragna et al. | .............. | 297/14 |
| 7,374,242 B2 * | 5/2008 | Champ et al. | ................ | 297/331 |
| 7,490,906 B2 * | 2/2009 | Schumacher et al. | ........ | 297/353 |
| 7,517,008 B2 * | 4/2009 | Ebel | ............................ | 297/14 |
| 7,559,594 B2 * | 7/2009 | McMillen | .................. | 297/14 X |
| 7,568,764 B2 * | 8/2009 | Harper et al. | ................ | 297/331 |
| 2006/0131945 A1 * | 6/2006 | Tanaka et al. | ............. | 297/14 X |
| 2007/0252404 A1 | 11/2007 | Muck et al. | | |

* cited by examiner

*Primary Examiner*—Rodney B White
(74) *Attorney, Agent, or Firm*—Young Basile

(57) ABSTRACT

An adjustable seat for use in a passenger compartment of a vehicle. A seat cushion is slidably mounted for movement between an aft position and a fore position, and a seat back is connected to the seat cushion. A latch connected to the seat back, and a mounting member is connected to the vehicle that releasably engages the latch to limit fore-aft movement of the seat back with respect to the mounting member so that movement of the seat cushion from the aft position to the fore position moves the seat back from an upright position to a reclined position.

23 Claims, 6 Drawing Sheets

ADJUSTABLE SEAT FOR USE IN A VEHICLE

FIELD OF THE INVENTION

The invention relates to the field seat assemblies for use in vehicles such as automobiles and tucks.

BACKGROUND

It is known to provide seats that can fold to provide room for cargo in vehicles, including trucks. For example, in some vehicles, the rear seat includes a seat back and a seat cushion. The seat cushion can fold up toward the seat back into a stowed position to provide storage space in front of the seat. The seat back can fold down toward the seat cushion to a folded flat position to provide storage space above the seat. For safety and other considerations, the seat back is secured to the vehicle body to support the seat back and ensure that the seat back will not move forward while occupied.

While folding seats, particularly rear seats, offer convenience and flexibility for storing cargo, they are difficult to adjust for optimum comfort of the occupants. It would be desirable to provide an inexpensive, easy-to-use mechanism to provide adjustment of a folding seat in a vehicle.

SUMMARY

The disclosed embodiments include an adjustable seat for use in a passenger compartment of a vehicle. In one embodiment, the adjustable seat includes a seat cushion that is slidably mounted for movement between an aft position and a fore position, and a seat back that is connected to the seat cushion. The adjustable seat further includes a latch that is connected to the seat back, and a mounting member that is connected to a rear wall of the passenger compartment that releasably engages the latch to limit fore-aft movement of the seat back with respect to the mounting member so that movement of the seat cushion from the aft position to the fore position moves the seat back from an upright position to a reclined position.

In some embodiments, the mounting member may be an upright bar, where the latch is slidably related to the mounting member. Furthermore, the latch may move with respect to the mounting member so that the latch is disposed in an upper position when the seat cushion is in the aft position and the latch is disposed in a lower position when the seat cushion is in the fore position.

In other embodiments, the seat cushion may be pivotally mounted to the vehicle for movement between a seating position and a stowed position, such that the latch is engaged with the mounting member when the seat cushion is in the seating position and when the seat cushion is disposed in the stowed position.

In still other embodiments, the seat back may be pivotally mounted to the seat cushion for movement between a seating position and a folded flat position, such that the latch is engaged with the mounting member when the seat back is in the seating position and the latch is not engaged with the mounting member when the seat back is in the folded flat position.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
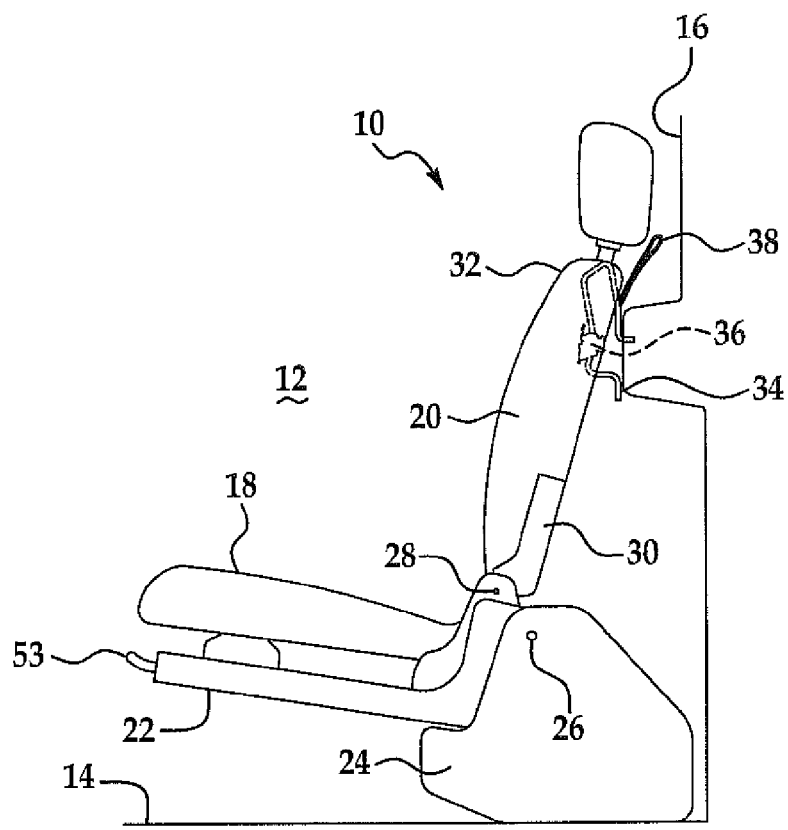
FIG. 1 is an illustration showing an adjustable seat according to the invention where a seat back of the adjustable seat is disposed in an upright seating position and a seat cushion of the adjustable seat is disposed in an aft seating position.

FIGS. 1-6 show an adjustable seat 10 for use in a passenger compartment 12 of a vehicle (not shown). Although the adjustable seat 10 is not limited to use with any particular type of vehicle, the vehicle may be a truck that has an extended cab or crew cab, in which the adjustable seat 10 serves as a rear row of seating that is disposed upon a floor 14 of the passenger compartment 12 and forward of a rear wall 16 of the passenger compartment 12.

The adjustable seat 10 includes a seat cushion 18 and a seat back 20. The seat cushion 18 is slidably connected to a sliding frame 22 for movement between a fore seating position and an aft seating position, which are referred to herein as the fore position and the aft position, respectively. In the aft position (best seen in FIG. 1) of the seat cushion 18, the distance between the seat cushion 18 and the rear wall 16 of the passenger compartment 12 is less than the distance between the seat cushion 18 and the rear wall 16 of the passenger compartment 12 when the seat cushion 18 is in the fore position (seen in FIG. 2). That is to say that the seat cushion 18 moves from the aft position to the fore position by moving forward with respect to the direction of travel of the vehicle, and thus, away from the rear wall 16 of the passenger compartment 12.

The slidable connection between the sliding frame 22 and the cushion 18 is provided by a first pair of track members 50 that are provided on the sliding frame 22 and a second pair of track members 52 that are provided on a cushion frame 54 of the seat cushion 18. The second pair of track members 52 of the seat cushion 18 slidingly engage the first pair of track members 50 of the sliding frame 22 to allow the seat cushion 18 to slide between the fore and aft positions. An adjustment lever 53 is provided on the cushion frame 54 of the seat cushion 18 to selectively restrain fore and aft movement of the seat cushion 18 with respect to the sliding frame 22. In particular, the adjustment lever 53 moves between an engaged position and a disengaged position. In the engaged position of the adjustment lever 53, the first pair of track members 50 is locked with respect to the second pair of track members 52, and thus the seat cushion 18 is restrained against moving between the fore position and the aft position. In the disengaged position of the adjustment lever 53, the first pair of track members 50 is free to slide fore and aft with respect to the second pair of track members 52, and thus the seat cushion 18 is free to move between the fore position and the aft position.

A pair of support members 24 are the primary load bearing portions of the adjustable seat 10, and are connected to the sliding frame 22 as the sole means of support for the sliding frame 22. The support members 24 are generally upstanding frame or truss-like members that are rigidly connected to the floor 14 of the passenger compartment 12 on opposite lateral sides of the sliding frame 22.

A first pivot joint 26 is formed on each support member 24 to pivotally connect the sliding frame 22 to each support member 24. The first pivot joints 26 are located at an upper end of the support members 24, opposite the floor 14 of the passenger compartment 12. Thus, the support members 24 space the sliding frame 22 from the floor 14 of the passenger compartment 12.

Figure 2:
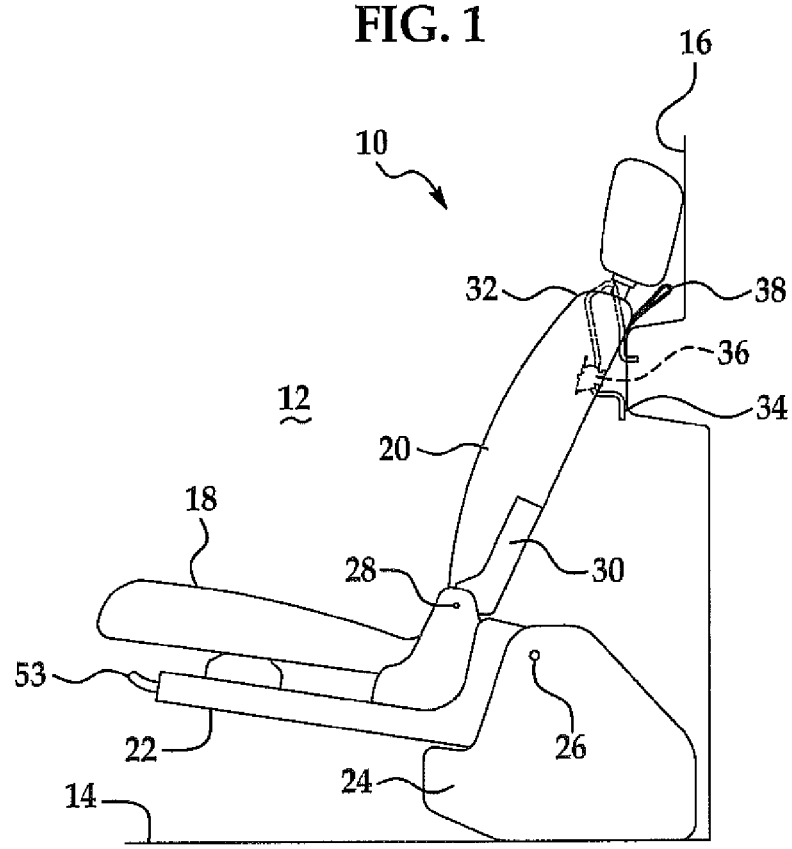
FIG. 2 is an illustration showing the adjustable seat according to the invention where the seat back is disposed in a reclined seating position and the seat cushion is disposed in a fore seating position.
Figure 3:
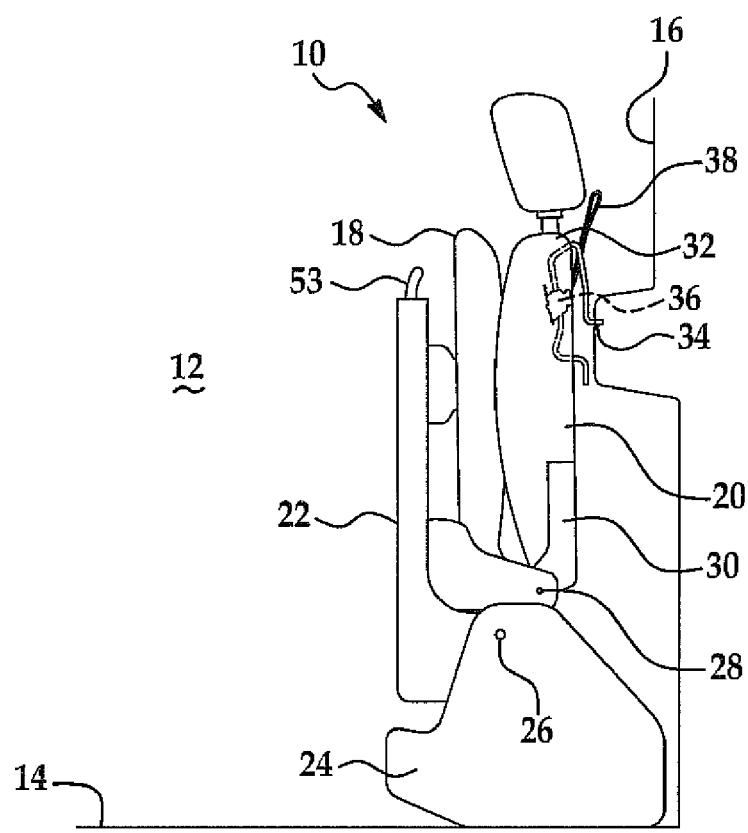
FIG. 3 is an illustration showing the adjustable seat according to the invention where the seat cushion is disposed in an aft stowed position.
Figure 4:
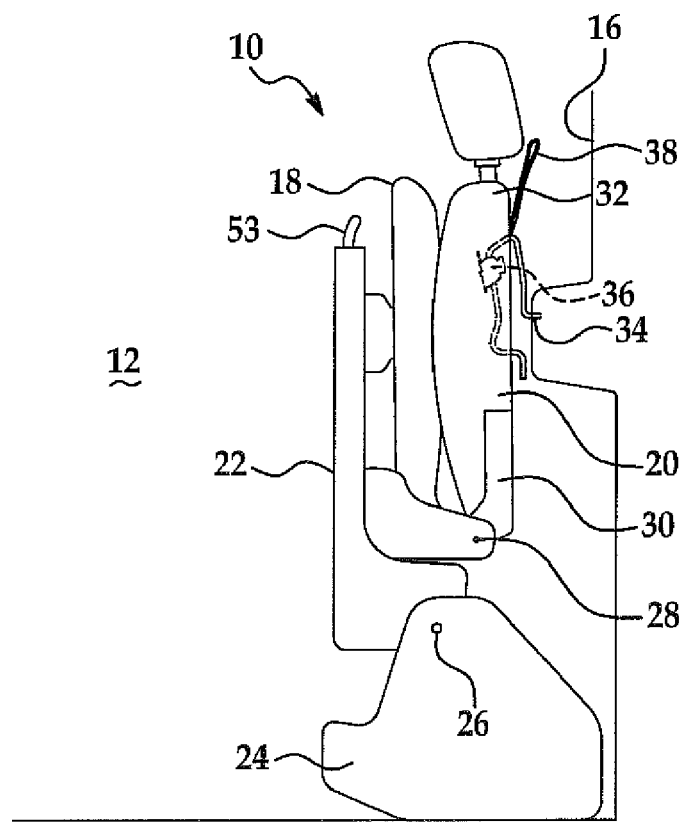
FIG. 4 is an illustration showing the adjustable seat according to the invention where the seat cushion is disposed in a fore stowed position.
Figure 5:
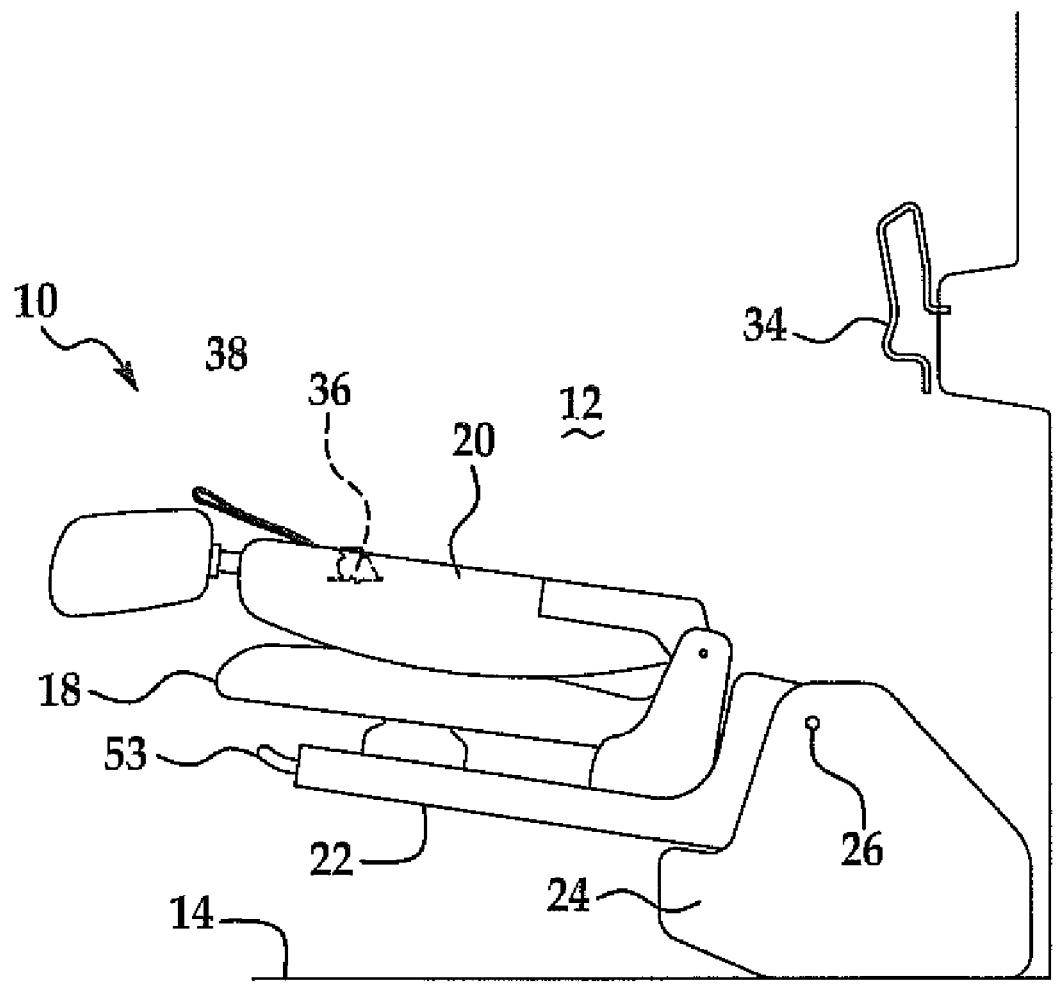
FIG. 5 is an illustration showing the adjustable seat according to the invention where the seat back disposed in a folded flat position.
Figure 6:
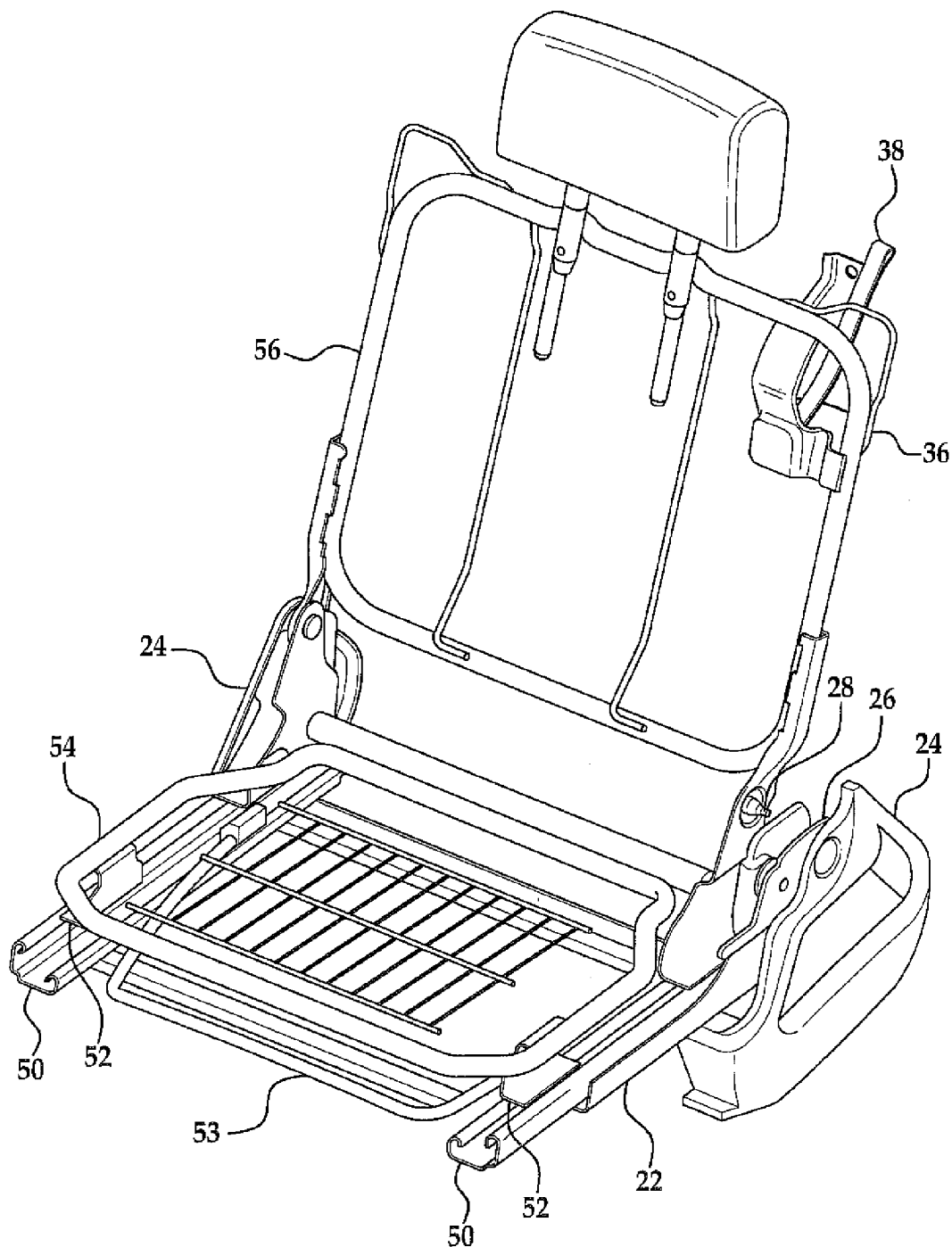
FIG. 6 is a perspective view showing the adjustable seat according to the invention where the seat cushion and the seat back are partially omitted to show a seat cushion frame of the seat cushion and a seat back frame of the seat back.

The sliding frame 22 and the seat cushion 18 pivot in unison with one another about the first pivot joints 26, and thus the seat cushion 18 and the sliding frame 22 are pivotally moveable with respect to the support members 24 about the first pivot joints 26 between a seating position (best seen in FIGS. 1-2), where the seat cushion 18 is configured to support a passenger (not shown) and a generally upright stowed position (seen in FIGS. 3-4). In the stowed position of the seat cushion 18 and the sliding frame 22, the seat cushion 18 and the sliding frame 22 are pivoted upward, away from the floor 14 of the passenger compartment 12, to allow for large items to be placed on the floor 14 of the passenger compartment 12 in front of the adjustable seat 10.

The seat back 20 is pivotally connected to the seat cushion 18 at a lower end 30 of the seat back 20 by a pair of second pivot joints 28 between the cushion frame 54 and a seat back frame 56 of the seat back 20. The seat 20 back is also releasably connected to a mounting member or striker 34 that is disposed on the rear wall 16 of the passenger compartment 12. Releasable connection of the seat back 20 with respect to the striker 34 is provided by a latch 36 that is rigidly connected to the seat back frame 56 near an upper end 32 of the seat back 20 and is releasably engageable with the striker 34 to accommodate movement of the seat back 20 between a seating position (seen in FIGS. 1-4) and a folded flat position (seen in FIG. 5). A release lever 38 is provided to disengage the latch 36 from the striker. In the seating position, the seat back 20 is generally upright, and the latch 36 is engaged with the striker 34. In the folded flat position, the seat back 20 is pivoted downward into engagement with the seat cushion 18, is disposed in a generally horizontal orientation, and the latch 36 is not engaged with the striker 34.

While the seat back 20 is disposed in the seating position, the seat back 20 is moveable between upright and reclined seating positions, which are referred to herein as the upright position and the reclined position, respectively. When the seat back 20 is in the reclined position (seen in FIG. 2), the lower end 30 of the seat back 20 is further away from the rear wall 16 of the passenger compartment 12 as compared to when the seat back 20 is in the upright position (seen in FIG. 1). However, the distance between the upper end 32 of the seat back 20 remains substantially constant between the upright and reclined positions, because the latch 36 remains connected to the striker 34 while the seat back 20 moves between the upright and reclined positions, as will be explained further herein.

Movement of the seat back 20 between the upright position and the reclined position is dependent upon movement of the seat cushion 18 between the aft position and the fore position. More particularly, when the seat cushion 18 is in the aft position, the seat back 20 is in the upright position, when the seat cushion 18 is in the fore position, the seat back 20 is in the reclined position. Consequently, as the seat cushion 18 moves from the aft position to the fore position, the seat back 20 necessarily moves simultaneously from the upright position to the reclined position, and when the seat cushion 18 moves from the fore position to the aft position, the seat back 20 necessarily moves simultaneously from the reclined position to the upright position.

As best seen in FIGS. 7-10, the striker 34 is a substantially upright bar or rod, and the latch 36 is slidably related to the striker 34. Engagement of the latch 36 with the striker 34 limits fore-aft movement of the upper end 32 of the seat back 20 while the adjustable seat 10 moves between the various positions shown in FIGS. 1-4, while allowing elevational and rotational movement of the upper end 32 of the seat back 20 over a predetermined range of motion that is defined by the geometry of the striker 34. Thus, the striker 34 accommodates the movement induced in the seat back 20 by the seat cushion 18 as the seat cushion moves between the fore position and aft positions, as well as between the stowed position and the seating position.

Since the latch 36 is rigidly connected to the seat back frame 56, elevation change of the upper end 32 of the seat back 20 is accommodated by sliding motion of the latch 36 with respect to the striker 34, while rotation of the upper end 32 of the seat back 20 is provided by the curvilinear geometry of the striker 34. More particularly, the striker 34 includes an engaging area defined by a curved portion 60 that is disposed between an upper linear portion 62 and a lower linear portion 64, which define the upper and lower limits, respectively, of the engaging area of the striker 34. The curved portion 60 of the striker 34 defines an arc that connects the upper linear portion 62 and the lower linear portion 64 of the striker 34 such that the upper and lower linear portions 62, 64 extend at an obtuse angle with respect to one another.

Figure 7:
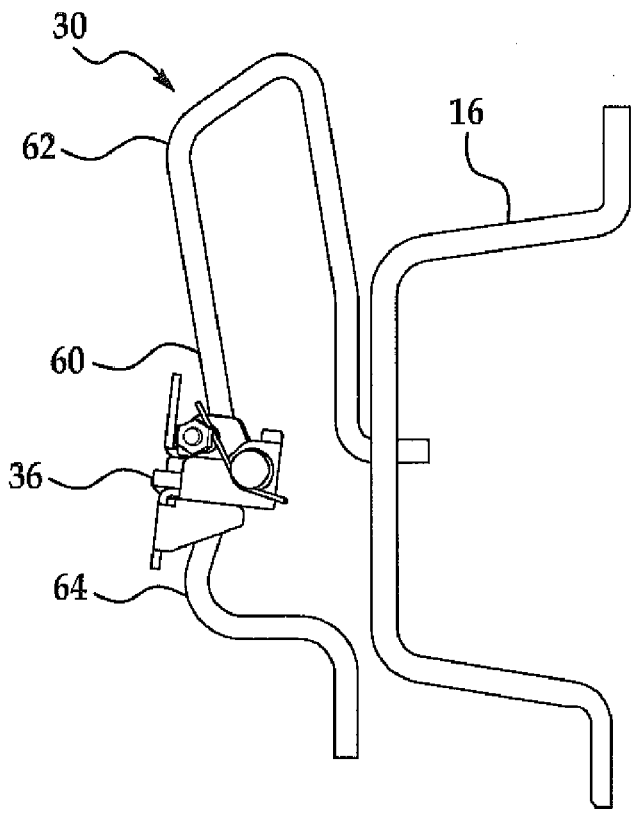
FIG. 7 is an illustration showing a latch and a striker when the seat back of the adjustable seat is disposed in an upright seating position and the seat cushion of the adjustable seat is disposed in the aft seating position.
Figure 8:
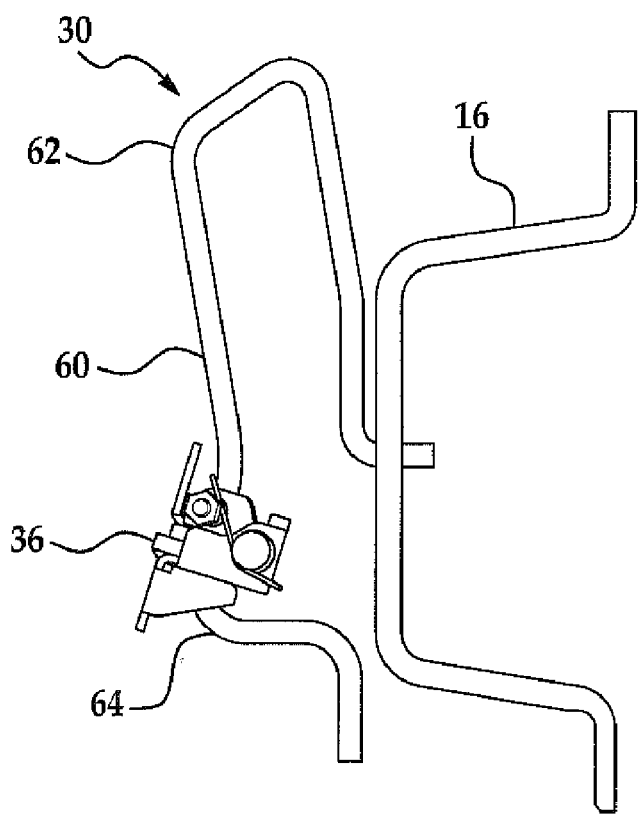
FIG. 8 is an illustration showing a latch and a striker when the seat back of the adjustable seat is disposed in the reclined seating position and the seat cushion of the adjustable seat is disposed in the fore seating position.

When the seat back 20 is in the upright position and the seat cushion 18 is in the aft seating position (as seen in FIG. 1), the latch 36 is disposed on the curved portion of the striker 34, as shown in FIG. 7. When the seat back 20 is in the reclined position and the seat cushion 18 is in the fore seating position (as seen in FIG. 2), the latch 36 is disposed on the lower linear portion 64 of the striker 34, as shown in FIG. 8. Thus, when the seat back 20 of the adjustable seat 10 moves from the upright position to the reclined position, the latch 36 moves downward along the striker 34 from the curved portion 60 to the lower linear portion 64, and in so doing, the latch 36 rotates slightly in accordance with the geometry of the striker.

Figure 9:
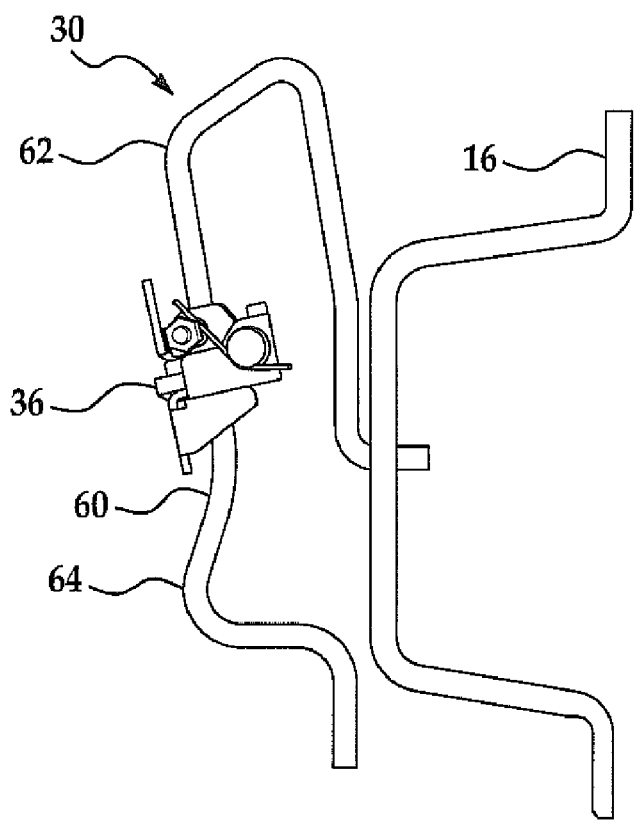
FIG. 9 is an illustration showing a latch and a striker when the adjustable seat is disposed in the aft stowed position.
Figure 10:
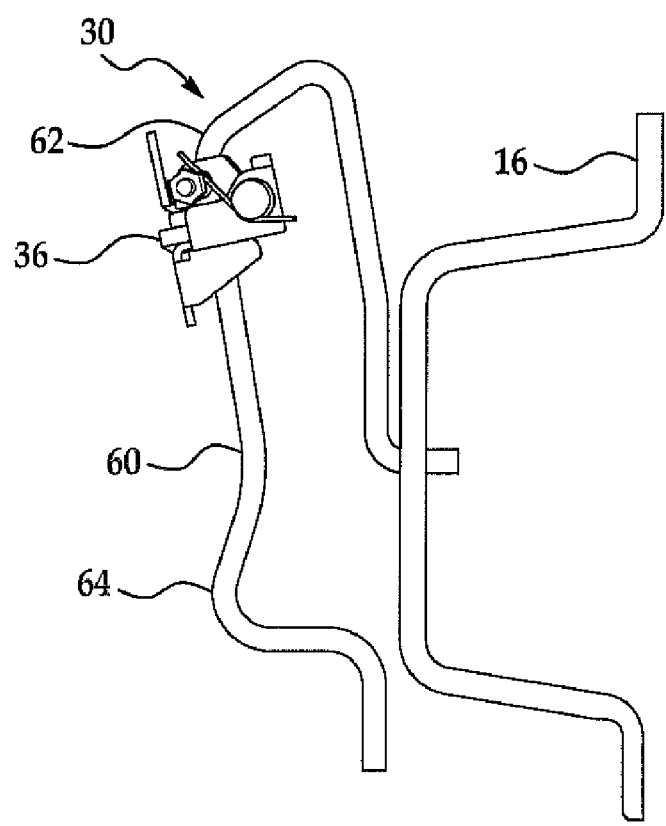
FIG. 10 is an illustration showing a latch and a striker when the adjustable seat is disposed in the fore stowed position.

When the seat cushion 18 is moved from the seating position to the stowed position, the seat cushion 18 rotates with respect to the first pivot joint 26, which in turn rotates the second pivot joint 28 about the first pivot joint 26. At the same time, the seat cushion 18 and the seat back 20 pivot with respect to one another about the second pivot joint 28. As a result, the elevational and rotational positions of the latch 36 change when the seat cushion 18 is moved from the seating position to the stowed position. More particularly, the latch moves either from the curved portion 60 or the lower linear portion 64 of the striker to the upper linear portion 62 of the striker 34. However, the upper linear portion 62 of the striker 34 is provided with sufficient length to allow the seat cushion 18 to be moved from the seating position to the stowed position when the seat cushion 18 is in either of the fore position or the aft position. When the seat cushion 18 is moved from the seating position to the stowed position while the seat cushion 18 is in the aft position (as seen in FIG. 3), the latch 36 rotates onto the upper linear portion 62 of the striker 34 and moves slightly upward along the striker 34 to a point slightly above the curved portion 60 of the striker 34, as shown in FIG. 9. When the seat cushion 18 is moved from the seating position to the stowed position while the seat cushion 18 is in the fore position (as seen in FIG. 4), the latch 36 rotates onto the upper linear portion 62 of the striker 34 and moves upward to the far end of the upper linear portion 62 of the striker 34, near the upper limit of the engagement area of the striker 34, as seen in FIG. 10.

In use, a user of the adjustable seat 10 may move the seat back 20 of the adjustable seat 10 between upright and reclined positions. With the seat cushion 18 in the seating position, the seat back 20 in the seating position, and the latch 36 engaged with the striker 34, the user moves the seat cushion 18 from the aft position to the fore position. As the user does so the seat back 20 simultaneously moves from the upright position to the reclined position, due to the pivotal connection between the seat cushion 18 and the seat back 20 at the second pivot joints 28. If the user wishes to return the seat back 20 to the upright position from the reclined position, the user moves the seat cushion 18 from the fore position to the aft position. As the user does so, the seat back 20 simultaneously moves from the reclined position to the upright position.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An adjustable seat for use in a passenger compartment or a vehicle, comprising:
    a seat cushion that is slidably mounted for movement between an aft position and a fore position;
    a seat back that is connected to the seat cushion;
    a latch connected to the seat back; and
    a mounting member adapted to be connected to a rear wall of the passenger compartment that releasably engages the latch to limit fore-aft movement of the seat back with respect to the rear wall of the passenger compartment so that movement of the seat cushion from the aft position to the fore position causes the seat back to move from an upright position to a reclined position, wherein the mounting member is an upright bar, and the latch is slidably related to the mounting member such that the latch slides downward along the mounting member as the seatback moves from the upright position to the reclined position.

2. The adjustable seat of claim 1, wherein the latch moves downward with respect to the mounting member as the seat cushion moves from the aft position to the fore position.

3. The adjustable seat of claim 1, wherein the seat cushion is pivotally mounted with respect to a floor of the passenger compartment for movement between a seating position and a stowed position.

4. The adjustable seat of claim 3, wherein the latch is engaged with the mounting member when the seat cushion is in the seating position and when the seat cushion is disposed in the stowed position.

5. The adjustable seat of claim 1, wherein the seat back is pivotally mounted to the seat cushion for movement between a seating position and a folded flat position.

6. The adjustable seat of claim 5, wherein the latch is engaged with the mounting member when the seat back is in the seating position and the latch is not engaged with the mounting member when the seat back is in the folded flat position.

7. The adjustable seat of claim 6, further comprising:
    a release lever operatively connected to the latch for releasing engagement of the latch with respect to the mounting member.

8. The adjustable seat of claim 1, further comprising:
    an adjustment lever to selectively restrain the seat cushion from moving between the aft position and the fore position.

9. An adjustable seat for use in a passenger compartment of a vehicle, comprising:
    at least one support member adapted to be connected to a floor of the passenger compartment;
    a sliding frame pivotally connected to the at least one support member;
    a seat cushion that is slidably mounted to the sliding frame for movement between an aft position and a fore position;
    a seat back that is pivotally connected to the seat cushion at a lower end of the seat back;
    a latch connected to the seat back at an upper end of the seat back; and
    a mounting member adapted to be connected to a rear wall of the passenger compartment that releasably engages the latch to limit fore-aft movement of the upper end of the seat back with respect to the rear wall of the passenger compartment so that movement of the seat cushion from the aft position to the fore position causes the seat back to pivot with respect to the seat cushion from an upright position to a reclined position, wherein the mounting member is an upright bar, and the latch is slidably related to the mounting member such that the latch slides downward along the mounting member as the seatback moves from the upright position to the reclined position.

10. The adjustable seat of claim 9, wherein the latch moves downward with respect to the mounting member as the seat cushion moves from the aft position to the fore position.

11. The adjustable seat of claim 9, wherein the seat cushion and the sliding frame are pivotally movable with respect to the at least one support member for movement between a seating position and a stowed position.

12. The adjustable seat of claim 11, wherein the latch is engaged with the mounting member when the seat cushion is in the seating position and when the seat cushion is in the stowed position.

13. The adjustable seat of claim 9, wherein the seat back is pivotally moveable with respect to the seat cushion between a seating position and a folded flat position.

14. The adjustable seat of claim 13, wherein the latch is engaged with the mounting member when the seat back is in the generally upright seating position and the latch is not engaged with the mounting member when the seat back is in the folded flat position.

15. The adjustable seat of claim 9, wherein the at least one support member spaces the sliding frame with respect to the floor of the passenger compartment.

16. The adjustable seat of claim 9, further comprising:
an adjustment lever to selectively restrain the seat cushion from moving between the aft position and the fore position.

17. An adjustable seat for use in a passenger compartment of a vehicle, comprising:
a pair of support members adapted to be connected to a floor of the passenger compartment;
a sliding frame pivotally connected to the pair of support members by a first pivot joint so that the pair of support members space the sliding frame from the floor of the passenger compartment, the sliding frame having a first pair of track members;
a seat cushion having a second pair of track members, the second pair of track members engaged with the first pair of track members of the sliding frame to slidably mount the seat cushion to the sliding frame for movement between an aft position and a fore position, the seat cushion and the sliding frame pivotally movable with respect to the pair of support members about the first pivot joint for movement between a seating position and a stowed position;
a seat back that is pivotally connected to the seat cushion by a second pivot joint at a lower end of the seat back for movement of the seat back between a seating position and a folded flat position;
a latch connected to the seat back at an upper end of the seat back; and
a mounting member adapted to be connected to a rear wall of the passenger compartment that releasably engages the latch to limit fore-aft movement of the upper end of the seat back with respect to the rear wall of the passenger compartment so that movement of the seat cushion from the aft position to the fore position causes the seat back to pivot with respect to the seat cushion from an upright position to a reclined position, wherein the mounting member is an upright bar, and the latch is slidably related to the mounting member such that the latch slides downward along the mounting member as the seatback moves from the upright position to the reclined position.

18. The adjustable seat of claim 17, wherein the latch moves downward with respect to the mounting member as the seat cushion moves from the aft position to the fore position.

19. The adjustable seat of claim 17, wherein the latch is engaged with the mounting member when the seat cushion is in the seating position or in the generally upright stowed position.

20. The adjustable seat of claim 17, wherein the latch is engaged with the mounting member when the seat back is in the seating position and the latch is not engaged with the mounting member when the seat back is in the folded flat position.

21. The adjustable seat of claim 17, further comprising:
an adjustment lever to selectively restrain the seat cushion from moving between the aft position and the fore position.

22. The adjustable seat of claim 1, further comprising:
the mounting member having a curved portion, wherein the latch moves along the curved portion of the mounting member as the seat back moves from the upright position to the reclined position.

23. The adjustable seat of claim 1, wherein the latch is recessed with respect to a rear surface of the seat back.

* * * * *